US009621722B2

(12) United States Patent
Krack et al.

(10) Patent No.: US 9,621,722 B2
(45) Date of Patent: Apr. 11, 2017

(54) CALLER AUTHENTICATION

(71) Applicant: Avaya Inc., Santa Clara, CA (US)

(72) Inventors: Michael Krack, St. Pete Beach, FL (US); Jeffrey Wong, San Jose, CA (US); Wayne Wong, Milpitas, CA (US); Jai Pugalia, San Jose, CA (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/516,177

(22) Filed: Oct. 16, 2014

(65) Prior Publication Data

US 2016/0112562 A1    Apr. 21, 2016

(51) Int. Cl.
*H04M 3/00* (2006.01)
*H04M 3/42* (2006.01)
*H04M 3/436* (2006.01)
*H04M 3/523* (2006.01)
*H04M 3/51* (2006.01)

(52) U.S. Cl.
CPC ....... *H04M 3/4365* (2013.01); *H04M 3/5166* (2013.01); *H04M 3/523* (2013.01)

(58) Field of Classification Search
CPC .. H04M 3/436; H04M 3/42042; H04M 3/493; H04M 3/382

USPC .... 379/207.13, 207.14, 142.01, 189, 207.11, 379/201.01, 188
See application file for complete search history.

(56) References Cited

U.S. PATENT DOCUMENTS

| | | | | |
|---|---|---|---|---|
| 8,881,245 | B2 * | 11/2014 | O'Connor | G06F 21/36 726/4 |
| 9,015,222 | B2 * | 4/2015 | Deshmukh | G06Q 10/06 709/201 |
| 2007/0156592 | A1 * | 7/2007 | Henderson | G06Q 10/06 705/51 |
| 2011/0026699 | A1 | 2/2011 | Amir et al. | |
| 2011/0270744 | A1 * | 11/2011 | Baker | G06Q 20/04 705/39 |
| 2013/0204785 | A1 * | 8/2013 | Monk | G06Q 20/322 705/44 |
| 2015/0170236 | A1 * | 6/2015 | O'Connor | H04L 63/083 705/26.35 |

* cited by examiner

*Primary Examiner* — Thjuan K Addy
(74) *Attorney, Agent, or Firm* — Sheridan Ross P.C.

(57) ABSTRACT

In order to authenticate a caller, a callee generates a code, such as, an alphanumeric code that is sent to a code manager via an electronic communication channel. The generated code is for authenticating a caller in a communication session to be made by the caller to the callee. The code manager stores the code in a memory. After the communication session has been initiated from the caller to the callee and then established, the code is sent to the callee so the callee can verify the caller is authentic.

21 Claims, 3 Drawing Sheets

CALLER AUTHENTICATION

TECHNICAL FIELD

The systems and methods disclosed herein relate to authentication processes and in particular to authentication of a calling party.

BACKGROUND

Currently there are a variety processes to authenticate a called party. For example, a bank may call one of its customers to ask the customer questions in regard to a recently received loan application. An agent for the bank can ask the customer specific questions to determine the authenticity of the customer. For example, the bank's agent can ask the customer about information that only the customer will know.

However, it is at times more difficult for a called party to determine if the calling party is authentic. In some cases, the called party may mistakenly think the calling party is legitimate, when in reality the calling party is impersonating another party. These types of incidents can lead to identity theft and other problems.

There have been some attempts to address this issue. For example, U.S. Patent Application Publication No. 2011/0026699 discloses a process of where a call screener is used to authenticate a caller. The caller registers with the call screener (of a callee) using a digital certificate to create an account. When the caller calls the callee, the call screener intercepts the incoming call and challenges the caller for the caller's digital certificate. Once the caller is authenticated, the call is sent to the callee. In other words, the callee verifies the same information that was given by the caller previously. The callee is only making sure that the person who established the account is the one making the call.

The problem with this type of system is that the digital certificate is generated by the caller. The person who created the account may have provided incorrect information or may have left the organization that he claims to represent. This may allow another party to impersonate the calling party.

SUMMARY

Systems and methods are provided to solve these and other problems and disadvantages of the prior art. In order to authenticate a caller, a callee generates a code, such as, an alphanumeric code that is sent to a code manager via an electronic communication channel. The generated code is for authenticating a caller in a communication session to be made by the caller to the callee. The code manager stores the code in a memory. After the communication session has been initiated from the caller to the callee and then established, the code is sent to the callee so the callee can verify the caller is authentic.

DETAILED DESCRIPTION

Figure 1:
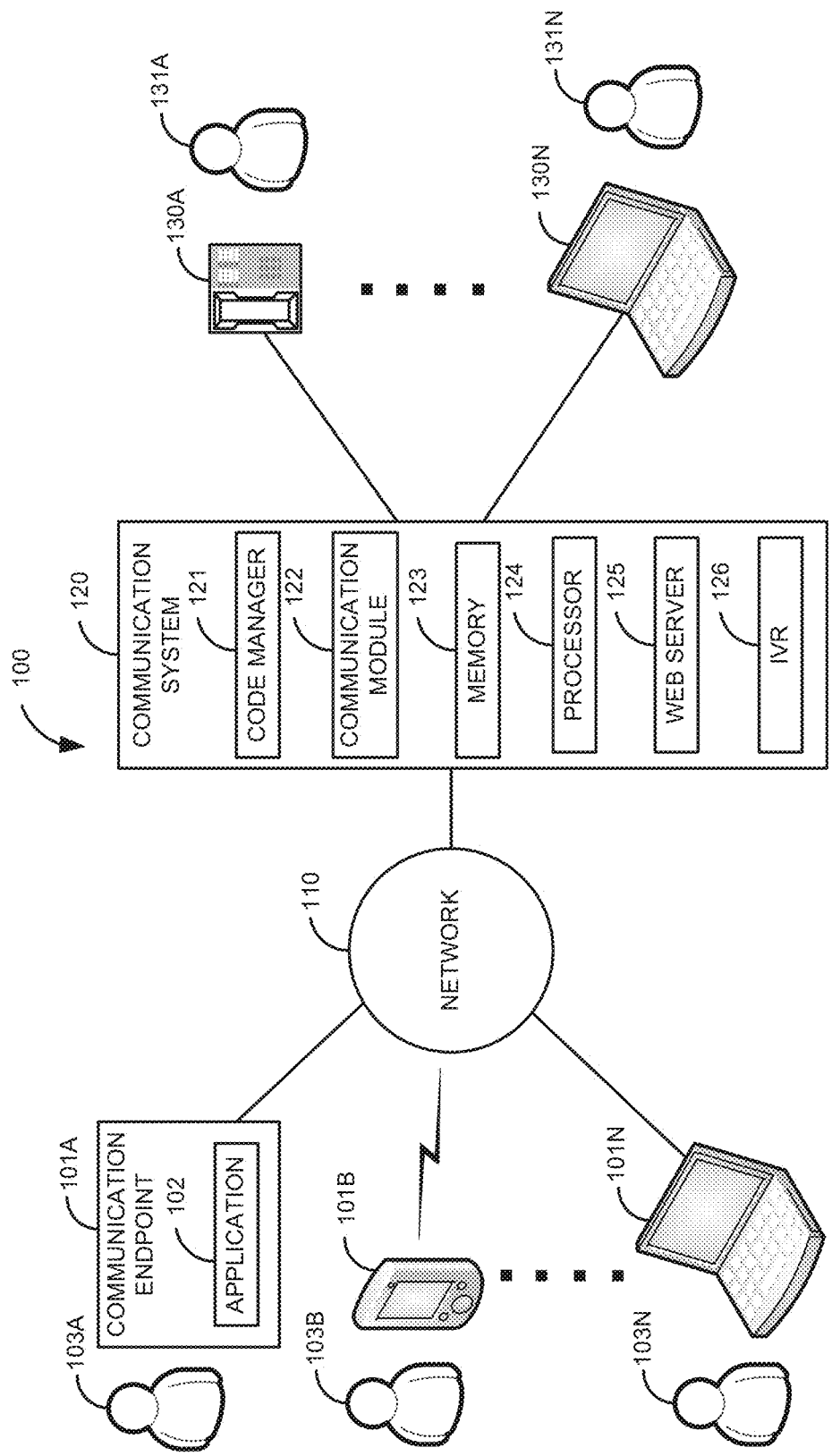
FIG. 1 is a block diagram of a first illustrative system for authenticating a caller.

FIG. 1 is a block diagram of a first illustrative system 100 for authenticating a caller. The first illustrative system 100 comprises communication endpoints 101A-101N, a network 110, a communication system 120, and agent terminals 130A-130N.

The communication endpoints 101A-101N can be or may include any communication endpoint 101 that can communicate on the network 110, such as a Personal Computer (PC), a telephone, a cellular telephone, a Personal Digital Assistant (PDA), a tablet device, a notebook device, a smart phone, a video phone, and/or the like. As shown in FIG. 1, any number of communication endpoints 101A-101N may be connected to network 110, including only a single communication endpoint 101. In addition, the communication endpoint 101 may be directly connected to the communication system 120. For example, by being hardwired to the communication system 120.

The communication endpoint 101 may also include an application 102. In this illustrative embodiment, the communication endpoint 101A includes the application 102. The other communication endpoints 101B-101N may or may not include the application 102. The application 102 can be any application 102 that can be used to send information associated with a callee, such as an application downloaded to a smart phone or other device.

FIG. 1 also shows a callee 103A-103N associated with each communication endpoint 101A-101N. A callee 103 is a person who is the recipient of an incoming call.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, video protocols, and/or the like.

The communication system 120 can be or may include any hardware/software that can provide communication services, such as a Private Branch Exchange (PBX), a central office switch, a communication manager in a call center, a router, and/or the like. The communication system 120 further comprises a code manager 121, a communication module 122, a memory 123, a processor 124, a web server 125, and an Interactive Voice Response (IVR) system 126.

The code manager 121 can be or may include any hardware/software that can manage codes. The communication module 122 can be or may include any hardware/software that can manage communication sessions, such as a PBX, a switch, a router, a conference bridge, a video bridge, a central office switch, and/or the like.

The memory 123 can be or may include any hardware that can store information, such as a hard disk, a Random Access Memory (RAM) a Read Only Memory (ROM), a Flash Memory, a compact disk, a DVD, a cache memory, a disk array, and/or the like. The processor 124 can be or may include any hardware that can process instructions, such as a digital signaling processor, a microcontroller, an application specific processor, an array of processors, and/or the like.

The web server 125 can be or may include any application that can host web applications. The Interactive Voice Response system (IVR 126) can be or may include any hardware/software that can process an interactive voice or video session, such as a digital signaling processor, a digital signaling processing application, and/or the like.

The agent terminals 130A-130N can be any communication device that can be used by an agent in a call center, such as the communication endpoint 101. The agent terminal 130 can include multiple devices, such as a telephone and a personal computer. The agent terminals 130A-130N are associated with an agent 131A-131N. An agent is person or device (e.g., the IVR 126) that can provide services to a callee 103.

Figure 2:
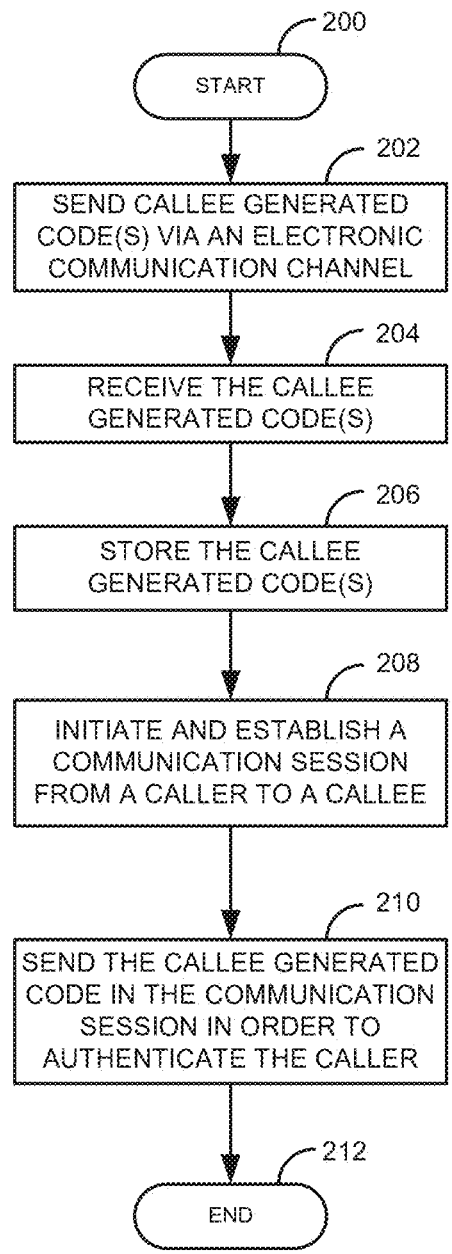
FIG. 2 is a flow diagram of a process for authenticating a caller.
Figure 3:
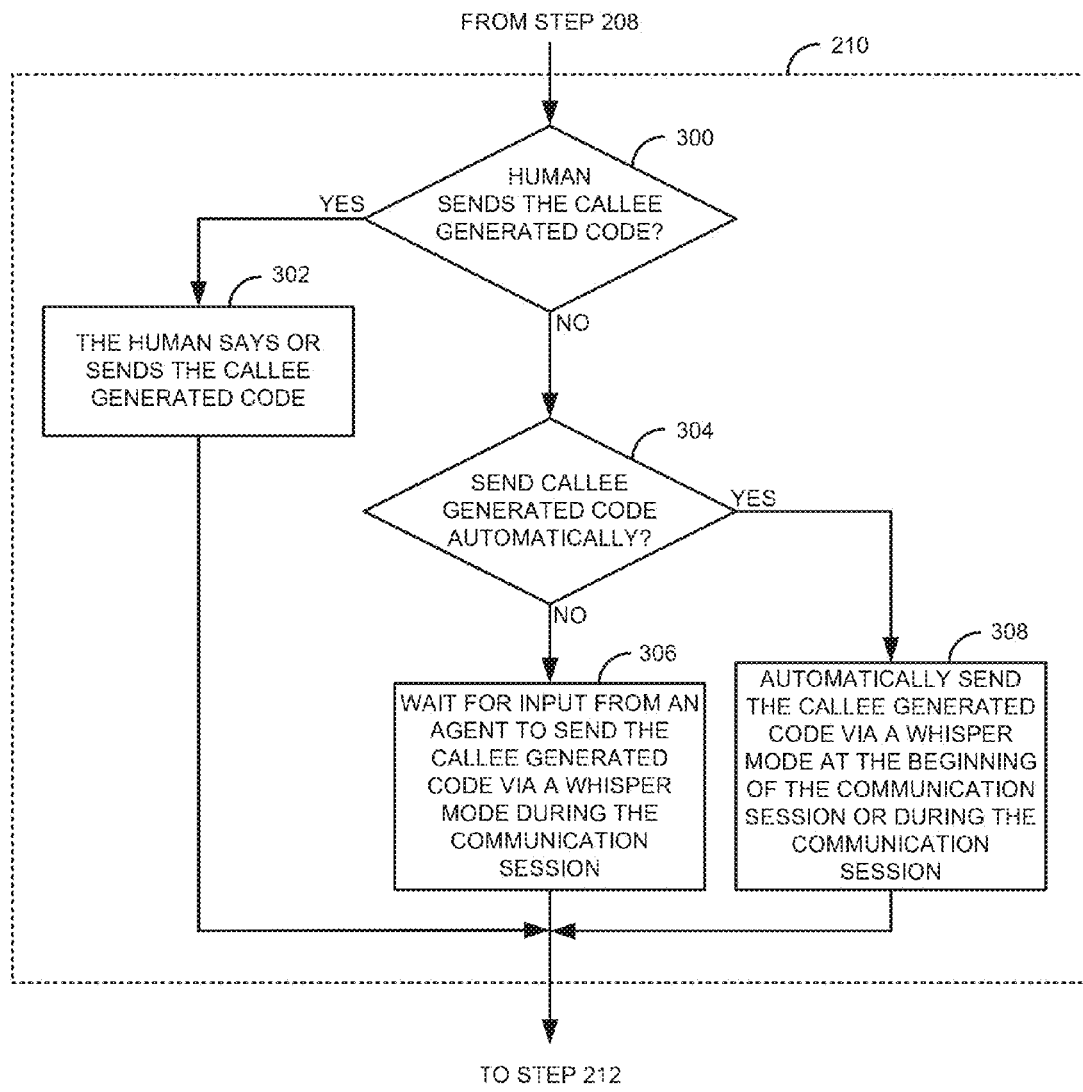
FIG. 3 is a flow diagram of a process for sending a callee generated code.

FIGS. 2-3 depicts various details of a process for authenticating a caller. Illustratively, the communication endpoints 101A-101N, the communication system 120, the code manager 121, the communication module 122, the web server 125, and the IVR 126 are stored-program-controlled entities, such as a computer or processor 124, which performs the method of FIGS. 2-3 and the processes described herein by executing program instructions stored in a tangible computer readable storage medium, such as the memory 123. Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

With initial reference to FIG. 2, a first flow diagram depicting a process for authenticating a caller will be described. The process starts in step 200. A callee 103 sends one or more callee generated code(s) via an electronic communication channel in step 202. An electronic communication channel can be any electronic communication channel, such as a voice communication channel, a video communication channel, an Instant Messaging (IM) communication channel, an email communication channel, a text messaging communication channel, and/or the like.

A callee generated code can be any type of code that a callee 103 can generate that is typically unique to the caller. For example, the callee generated code may be an alphanumeric code, a numeric code, a recorded sound sequence, a recorded word or phrase spoken by the callee 103, a recorded gesture or movement, a recorded video conversation with the callee 103, a drawing, a combination of these, and the like. The callee generated code is a code that is used to authenticate a caller. A caller can be agent 131, a person, an organization, a company, and/or the like. The callee generated code can be specific to an individual person, an individual organization, an individual company, and/or the like. For example, the callee generated code can be for a company. In this case, the callee generated code can be used for any call made on behalf of the company.

The callee 103 can send the callee generated code(s) in various ways, such as via the application 102. For example, the callee 103 can download the application 102 on the communication endpoint 101 (e.g., on a smart phone). The callee 103 can then enter the callee generated code and send the callee generated code to the code manager 121. In one embodiment, the callee generated code can be a drawing. For example, the callee 103 can draw a figure or diagram via the application 102 and send the figure or diagram to the code manager 121.

Alternatively, the callee 103 can access a web page running on the web server 125 and enter in the callee generated code (e.g., a text and/or a drawing). The web server 125 sends the caller generated code to the code manager 121. In this embodiment, the application 102 is not necessary.

In another embodiment, the callee 103 can make a voice call to a specific number. When the callee 103 calls this number, the callee 103 is connected to the IVR 126. The user can then speak a word or phrase that is recorded by the IVR 126 as the callee generated code. The recorded word or phrase is sent to the code manager 121 in step 202.

In one embodiment, the recorded voice message may be converted to text to produce a text callee generated code. For example, a voice message recorded by the IVR 126 can be converted to text and sent to the code manager 121 in step 202.

In another embodiment, the caller may call a specific number to be connected to a video IVR 126. The video IVR 126 can record a gesture or movement of the callee 103 or a record a video conversation with the callee 103. The recorded voice/video is sent to the code manager 121 in step 202 as the callee generated code.

In another embodiment, the callee generated code can be given to an agent 131 during an initial communication session between the callee 103 and the agent 131. The initial communication session can be initiated by the caller (e.g., the agent 131A) or the callee 103. For example, the callee 103A has called a contact center for their bank. The initial call is received by the communication module 122. The communication module 122 connects the callee 103A to the agent 131A. The callee 103A discusses getting a loan with the bank. During the initial call, the agent 131A asks the callee 103A for the callee generated code. The callee 103A gives the agent 131A the callee generated code. The agent 131A then types in the callee generated code and the callee generated code is stored in the memory 123. The received callee generated code can then be used for a return communication session based on the initial communication session. For example to further discuss the loan with the bank. In this embodiment, the application 102 is not necessary.

In one embodiment, instead of the callee 103A giving the callee generated code to the agent 131A, the agent 131A can direct the callee 103A to the IVR 126. For example, after the call has been established, the agent 131A can press a button displayed on the agent terminal 130A to direct the callee to the IVR 126. The callee 103A can then give the callee generated code to the IVR 126 as discussed above. Once the callee 103A has given the callee generated code to the IVR 126, the callee 103A is reconnected to the agent 131A.

The callee generated code can be for a specific use. For example, the callee generated code can be a one-time use code. In this case, the one-time use code is valid for a single communication session from the caller. The one-time use code may be specific to a type of communication session (i.e., a communication session type use code). For example, the one-time use code may only work for a voice communication.

The callee generated code can be a time-period use code that expires after a defined time period. For example, the time-period use code may only be valid for a week. The time-period use code may also be tied to a specific type of communication session, such as voice, video, Instant Messaging, text, email, and/or the like.

The callee generated code can be a multiple communication session use code. For example, the code may be valid for two communication sessions from the caller. The multiple communication session use code may be tied to a specific type of communication session.

The callee generated code may be a permanent use code. For example the callee generated code will work for any communication sessions made by the caller. The permanent use code may also be tied to a specific type of communication session.

In one embodiment, the callee 103 can provide multiple (a plurality) of callee generated codes at the same time. Each of the callee generated codes may be a one-time use code (or any of the other types of codes/combinations described above). For example, the callee 103 may use the application 102 to enter two callee generated one-time use codes. The two one-time use codes can each be used once for two separate communication sessions initiated from the caller.

The code manager 121 receives the callee generated code(s) in step 204. The code manager 121 stores the callee generated code(s) in the memory 123 in step 206. At some point in time, the caller initiates and establishes a communication session to the callee 103 in step 208. For example, the agent 131A (the caller) initiates a voice call (could also be a video, IM, email, or text communication) via the communication module 122 to the callee 103A at the communication endpoint 101A.

During the communication session, the callee generated code is sent to the callee 103 to authenticate the caller (e.g., the agent 131A) in step 210. For example, once the agent 131A is connected in a voice call to the callee 103A, the agent reads or plays back the callee generated code to the callee. Alternatively, if the callee generated code is a drawing, the callee generated code may be sent to the callee 103A via a different medium. In a video communication session, the drawings can be shown as part of the video communication session. Based on hearing/viewing the callee generated code, the callee 103 can authenticate the caller.

To illustrate, consider the following example. The callee 103 calls the IVR 126. The callee 103 is asked to speak the callee generated code (step 202). The IVR 126 receives the callee generated code and sends it to the code manager 121 (step 204). The code manager 121 stores the callee generated code (step 206). The agent 131 initiates a voice call to the callee 103 (step 208). The voice call is established between the agent 131 and the callee 103 (step 208). The agent 131 plays the callee generated code to the callee 103 (step 210). The callee 103 authenticates the caller (the agent 131) based on the played callee generated code.

FIG. 3 is a flow diagram of a process for sending a callee generated code. The process of FIG. 3 is an exemplary embodiment of step 210 of FIG. 2. After the call has been initiated and established in step 208, the code manager 121 determines if a human will send the callee generated code in step 300. If the human will send the callee generated code in step 300, the human says or sends in the callee generated code in step 302 and the process goes to step 212.

For example, the agent 131 may have a pop-up message that informs the agent 131 to say the code to the callee 103 in a voice or video call. In one embodiment, the pop-up message could tell the agent 131 to play a callee generated code (e.g., a phrase spoken by the callee 103). In another embodiment, the pop-up message may tell the agent to display a drawing or send a drawing to the callee 103.

If the human is not to send the callee generated code in step 300, the code manager 121 determines if the callee generated code is to be sent automatically in step 304. If the callee generated code is to be sent automatically in step 304, the code manager 121 automatically sends the callee generated code via a whisper mode at the beginning of the communication session or during the communication session in step 308 and the process goes to step 212.

The whisper mode is where only the callee 103 hears the callee generated code and the agent 131 does not hear the callee generated code. This allows for increased security because the agent 131 will never be exposed to the callee generated code. Although step 308 describes using a whisper mode, the use of the whisper mode is not required.

Otherwise, if the callee generated code is not to be sent automatically, the code manager 121 waits for input from the agent 131 to send the callee generated code via the whisper mode during the communication session in step 306. For example, when the callee 103 asks for the callee generated code, the agent can select a button to send the callee generated code via the whisper mode. The process then goes to step 212.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system for authenticating a caller to a callee, the system comprising:
a processor; and
a memory, coupled to the processor, that stores a callee generated code and a code manager that causes the processor to receive the callee generated code via an electronic communication channel, wherein the callee generated code authenticates the caller in a first communication session to be made from the caller to the callee, and to send, during the first communication session, the callee generated code to a communication device of the callee to authenticate the caller to the callee and wherein the electronic communication channel is a different type of communication session than the first communication session or the electronic communication channel and first communication session are associated with different telephone calls.

2. The system of claim 1, wherein the caller is an agent of a contact center and further comprising a communication module that causes the processor to initiate and establish the first communication session from a communication device of the agent of the contact center to the communication device of the callee, wherein the electronic communication channel is a voice communication channel, a video communication channel, an Instant Messaging communication channel, an email communication channel, or a text messaging communication channel, and wherein a source communication device providing the callee generated code to the processor is different from the callee communication device participating in the first communication session.

3. The system of claim 1, wherein the callee generated code is an alphanumeric code, a numeric code, a recorded sound sequence, a recorded word spoken by the callee, a recorded movement, a recorded video conversation with the callee, or a drawing, wherein the callee generated code is received during an initial communication session between the callee communication device and an agent communication device in a call center, and wherein the first communication session is related to the initial communication session.

4. The system of claim 1, wherein the communication system is a contact center, wherein the callee generated code is one or more of an alphanumeric code, a numeric code, a recorded sound sequence, a recorded word or phrase spoken by the callee, a recorded gesture or movement, a recorded video conversation with the callee, or a drawing, and wherein the processor receives the callee generated code from a web server of the contact center.

5. The system of claim 1, wherein the first communication session is a telephone call and wherein the processor sends, in the first communication session, the callee generated code to the callee communication device via a whisper mode that the callee, and not the caller, can hear the callee generated code.

6. The system of claim 5, wherein the processor sends the callee generated code, in the first communication session, to the callee communication device via the whisper mode based on an input from an agent automatically at the beginning of the first communication session or automatically during the first communication session.

7. The system of claim 1, wherein the communication system is a contact center and wherein the processor receives the callee generated code from an Interactive Voice Response (IVR) system that receives the callee generated code from the callee communication device.

8. The system of claim 1, wherein the processor receives, from a source communication device of the callee, a plurality of callee generated codes at a same time, and wherein the plurality of callee generated codes are one-time use codes that can be each used for an individual communication session from the caller communication device to the callee communication device.

9. A method for authenticating an agent of a contact center to a callee, comprising:
   receiving, by a processor, a callee generated code via an electronic communication channel during a first communication session between a communication device of the callee and the contact center;
   in response to receiving the callee generated code, storing, by the processor, the callee generated code in a memory in association with the callee or the callee communication device;
   initiating, by the processor, a later second communication session between a communication device of an agent of the contact center and the callee communication device, wherein the first and second communication sessions are different types of communication sessions or the first and second communication sessions are associated with different telephone calls; and
   sending, by the processor during the second communication session, the callee generated code to the callee communication device to authenticate the contact center agent to the callee.

10. The method of claim 9, wherein the callee generated code is an alphanumeric code, a numeric code, a recorded sound sequence, a recorded word spoken by the callee, a recorded movement, a recorded video conversation with the callee, or a drawing and wherein the callee communication device in the first communication session is different from the callee communication device involved in the second communication session.

11. The method of claim 9, wherein the callee generated code is one or more of an alphanumeric code, a numeric code, a recorded sound sequence, a recorded word or phrase spoken by the callee, a recorded gesture or movement, a recorded video conversation with the callee, or a drawing and wherein the processor receives the callee generated code from a web server of the contact center.

12. The method of claim 9, wherein the callee generated code is one or more of an alphanumeric code, a numeric code, a recorded sound sequence, a recorded word or phrase spoken by the callee, a recorded gesture or movement, a recorded video conversation with the callee, and a drawing, wherein the callee generated code is a one-time use code, a time-period use code, a multiple communication session use code, a communication session type use code, or a permanent use code, and wherein the sending comprises:
   sending, by the processor, the callee generated code to the callee communication device by a mode that provides the callee generated code to the callee and not the agent.

13. The method of claim 12, wherein the mode is a whisper mode and wherein the sending is based on an input from an agent automatically at the beginning of the second communication session or automatically during the second communication session.

14. The method of claim 9, wherein the callee generated code is one or more of an alphanumeric code, a numeric code, a recorded sound sequence, a recorded word or phrase spoken by the callee, a recorded gesture or movement, a recorded video conversation with the callee, or a drawing and wherein the receiving comprises receiving, by the processor and from the communication device of the callee, the callee generated code by an Interactive Voice Response (IVR) system of the contact center.

15. The method of claim 9, wherein the receiving comprises receiving, by the processor, a plurality of callee generated codes at a same time, wherein the plurality of callee generated codes are one-time use codes that can be each used for an individual communication session from the agent communication device to the callee communication device.

16. A contact center comprising:
   a processor;
   a communication module, coupled with the processor, to manage a communication session between an agent communication device and a called communication device; and
   a memory, coupled with the processor, to store a callee generated code in association with a callee, wherein the processor receives the callee generated code via an electronic communication channel during a first communication session between a communication device of the callee and the contact center; initiates, by the communication module, a later second communication session between a communication device of an agent of the contact center and the callee communication device; and sends, by the communication module during the second communication session, the callee generated code to the callee communication device to authenticate the contact center agent to the callee, wherein the first and second communication sessions are different types of communication sessions or the first and second communication sessions are associated with different telephone calls.

17. The contact center of claim 16, wherein the callee generated code is an alphanumeric code, a numeric code, a recorded sound sequence, a recorded word spoken by the callee, a recorded movement, a recorded video conversation with the callee, or a drawing and wherein the callee communication device in the first communication session is different from the callee communication device involved in the second communication session.

18. The contact center of claim 16, wherein the callee generated code is one or more of an alphanumeric code, a numeric code, a recorded sound sequence, a recorded word or phrase spoken by the callee, a recorded gesture or movement, a recorded video conversation with the callee, or a drawing and wherein the processor receives the callee generated code from a web server of the contact center.

19. The contact center of claim 16, wherein the callee generated code is one or more of an alphanumeric code, a numeric code, a recorded sound sequence, a recorded word or phrase spoken by the callee, a recorded gesture or movement, a recorded video conversation with the callee, or a drawing, wherein the callee generated code is a one-time use code, a time-period use code, a multiple communication session use code, a communication session type use code, or a permanent use code, and wherein the processor sends the callee generated code to the callee by a mode that provides the callee generated code to the callee and not the agent.

20. The contact center of claim 16, wherein the callee generated code is one or more of an alphanumeric code, a numeric code, a recorded sound sequence, a recorded word or phrase spoken by the callee, a recorded gesture or movement, a recorded video conversation with the callee, or a drawing and wherein an Interactive Voice Response (IVR) system of the contact center receives the callee generated code from the communication device of the callee.

21. The contact center of claim 16, wherein the processor receives a plurality of callee generated codes from the callee communication device at a same time and wherein the plurality of callee generated codes are one-time use codes that can be each used for an individual communication session from the agent communication device and the callee communication device.

\* \* \* \* \*